United States Patent

Mourou

(10) Patent No.: US 8,070,204 B2
(45) Date of Patent: Dec. 6, 2011

(54) CLIP FOR ATTACHMENT TO AT LEAST ONE PANEL OF A VEHICLE TO SUPPORT A MOLDING

(75) Inventor: Julien P. Mourou, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 333 days.

(21) Appl. No.: 12/367,934

(22) Filed: Feb. 9, 2009

(65) Prior Publication Data

US 2010/0199593 A1  Aug. 12, 2010

(51) Int. Cl.
*B62D 39/00* (2006.01)

(52) U.S. Cl. .................................. 296/1.08; 296/187.02

(58) Field of Classification Search .................. 296/1.08, 296/187.02, 213; 52/716.7, 745.21
See application file for complete search history.

(56) References Cited

U.S. PATENT DOCUMENTS

| 6,413,611 | B1 | 7/2002 | Roberts et al. | |
|---|---|---|---|---|
| 2001/0042353 | A1* | 11/2001 | Honda et al. | 52/731.6 |
| 2004/0061348 | A1* | 4/2004 | Takeda et al. | 296/1.08 |
| 2006/0086765 | A1* | 4/2006 | Harberts et al. | 224/309 |
| 2009/0021053 | A1* | 1/2009 | Harberts et al. | 296/213 |
| 2010/0172691 | A1* | 7/2010 | Ziehm et al. | 403/345 |

FOREIGN PATENT DOCUMENTS

JP  2001341586 A  12/2001

* cited by examiner

*Primary Examiner* — Lori Lyjak
(74) *Attorney, Agent, or Firm* — Quinn Law Group, PLLC

(57) ABSTRACT

A molding system includes a clip and a molding. The clip attaches to at least one panel of a vehicle. The clip includes a body that presents a surface. A pair of lips extends from the body in opposition to the surface. A fastener extends from the surface and is configured for engaging the at least one panel of the vehicle. A sealant is disposed on the surface. The sealant is configured to expand upon application of a condition such that the sealant engages the at least one panel of the vehicle to retain the clip to the at least one panel of the vehicle. The molding is configured to snap over the pair of lips on the clip such that the molding is secured to the at least one panel of the vehicle.

20 Claims, 1 Drawing Sheet

CLIP FOR ATTACHMENT TO AT LEAST ONE PANEL OF A VEHICLE TO SUPPORT A MOLDING

TECHNICAL FIELD

The present invention relates to a clip for attachment to at least one panel of a vehicle to support a molding.

BACKGROUND OF THE INVENTION

A vehicle may have a roof panel defining a roof ditch. A plurality of clips may be attached to the roof panel within the roof ditch. Each clip includes a body and a rivet extends through the body. Each roof ditch defines a plurality of openings where each opening corresponds to one of the clips. The clips are attached to the roof panel by inserting the rivet through the opening. Next, the rivets are actuated through the openings to secure the clips to the roof panel, through the openings. The roof ditch molding is then snapped over the plurality of clips to cover the roof ditch. To seal the openings within the roof ditch, a seal extends about the rivet of each clip and abuts the panel within the roof ditch.

SUMMARY OF THE INVENTION

A clip is configured for attachment to at least one panel of a vehicle to support a molding on the vehicle. The clip includes a body that presents a surface. A fastener extends from the surface and is configured to engage the panel of the vehicle. A sealant is disposed on the surface. The sealant is configured to expand upon application of a condition such that the sealant engages the at least one panel of the vehicle and retains the clip to the at least one panel of the vehicle.

A molding system is configured for attachment to at least one panel of a vehicle. The molding system includes a clip and a molding. The clip includes a body that presents a surface. A pair of lips extends from the body in opposition to the surface. A fastener extends from the surface and is configured to engage the at least one panel of the vehicle. A sealant is disposed on the surface. The sealant is configured to expand upon application of a condition such that the sealant engages the at least one panel of the vehicle to retain the clip to the at least one panel of the vehicle. The molding is configured for attachment to the pair of lips of the clip.

A method of attaching a clip to at least one panel of a vehicle includes forming an opening in the at least one panel of the vehicle. A fastener is inserted through the opening to engage the at least one panel and hold the clip to the at least one panel. A condition is applied to the clip such that a sealant that is disposed on the clip expands through the opening to seal the opening and retain the clip to the at least one panel.

By using an expandable sealant to secure the clip to the at least one panel, no additional tooling is required to activate the sealant. This means that the process of actuating the rivets is eliminated, saving time and money. In addition, the expandable sealant seals the opening in the panel, preventing leaks through the opening and between the panels without having to provide an additional seal on the surface of the clip.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike.

DESCRIPTION OF THE PREFERRED EMBODIMENTS

Figure 1:
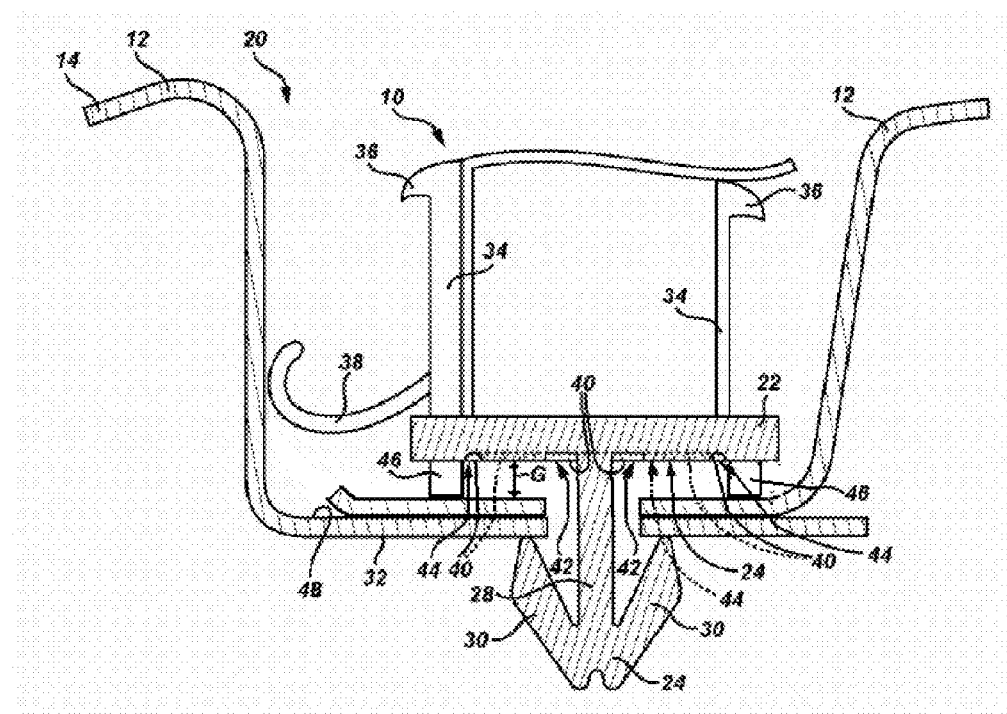
FIG. 1 is a schematic cross-sectional side view of a clip attached to panels of a vehicle with a sealant disposed on a surface of the clip.
Figure 2:
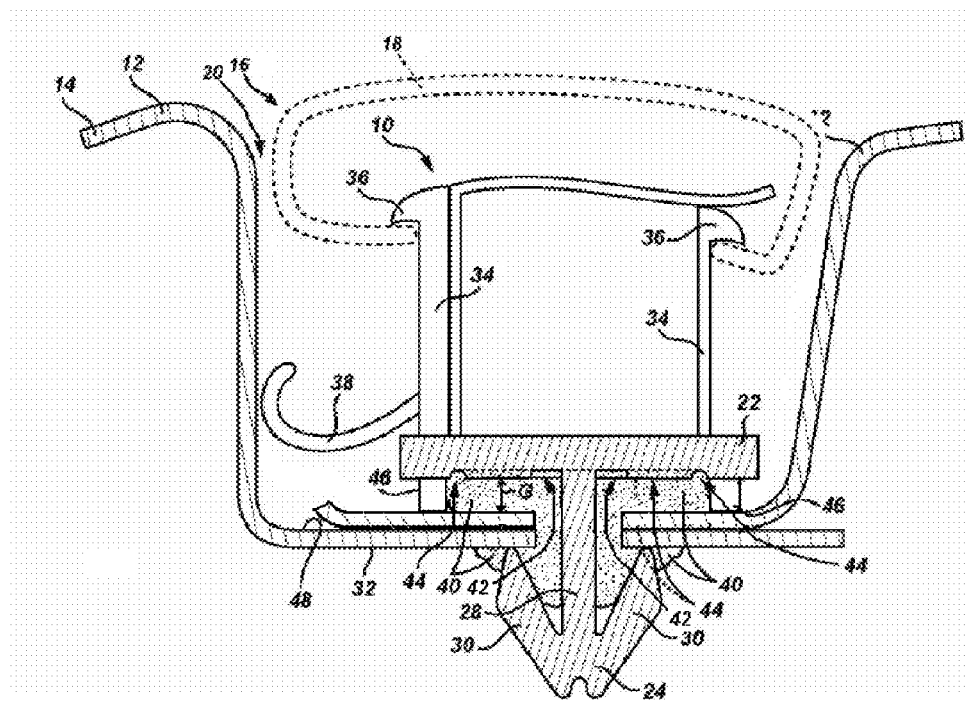
FIG. 2 is a schematic cross-sectional side view of the clip of FIG. 1 attached to the panels of the vehicle with the sealant expanded through an opening in the panel.

Referring to the drawings, wherein like reference numbers refer to like components, FIG. 1 shows a clip 10 attached to one or more panels 12A, 12B of a vehicle 14. A molding system 16, as shown in FIG. 2, includes the clip 10 and a molding 18 that is supported by the clip 10. The panels 12A, 12B of the vehicle 14 may be roof panels 12A, 12B that overlap one another to define a roof ditch 20. The molding 18 may be a roof ditch molding that connects to the clip 10 to cover the roof ditch 20. However, it should be appreciated that the panels 12A, 12B and the molding 18 are not limited to those described herein as other panels 12A, 12B and moldings 18 known to those skilled in the art may also be used. It should also be appreciated that any desired number of clips 10 may be spaced along the panel 12 of the vehicle 14 to support a single roof ditch 20 molding 18.

The clip 10 includes a body 22 that presents a surface 24. A fastener 25 extends from the surface 24 and is configured to engage the panel 12 of the vehicle 14. More specifically, the panels 12A, 12B of the vehicle 14 defines an opening 26 and the fastener 25 extends through the opening 26 to engage the panels 12A, 12B and retain the clip 10 to the panel 12. It should be appreciated that there may be a plurality of openings 26 defined along the roof ditch 20 and an equal number of clips 10 in engagement with the respective openings 26. The fastener 25 and the body 22 are a single piece. The clip 10 may be formed from injection molding 18. However, it should be appreciated that the clip 10 may also be formed from any other process known to those skilled in the art. The clip 10 may be formed from a polymer such as a polyamide, a thermoplastic, thermoset or combinations thereof. The polyamide may be nylon and the like. However, it should be appreciated that the clip 10 may be formed from any other suitable material known to those skilled in the art, such as metal, etc.

The fastener 25 may be a W-based fastener 25, as shown in FIGS. 1 and 2. A W-based fastener 25 includes a post 28 that extends from the base. A pair of fingers 30 extends from the post 28, toward the base, in opposing relationship to one another to form a general W-shape. The fingers 30 extend generally resiliently from the post 28 such that the fingers 30 move toward one another as the fastener 25 is moved through the opening 26. Once the fingers 30 have passed entirely through the opening 26, the fingers 30 move away from one another and generally abut an underside 32 of one of the panels 12A, 12B to loosely retain the clip 10 to the panels 12A, 12B. It should be appreciated, however, that the fastener 25 is not limited to being W-based, as any other fastener 25 known to those skilled in the art may also be used as long as the fastener 25 loosely retains the clip 10 to the panels 12A, 12B.

The clip 10 may also include a pair of arms 34 that extend from the body 22 in opposition to the fastener 25. Each arm 34 includes a lip 36 extending opposite one another. The molding 18 snaps over the lips 36 such that the lips 36 engage and support the molding 18 on the vehicle 14, as shown in FIG. 2. The molding 18 has a generally C-shaped cross-section that snaps over the lips 36. However, moldings 18 having other cross-sectional shapes may be used as known to those skilled in the art. At least one spacer 38 may extend generally perpendicularly from one of the arms 34 and the post 28 of the fastener 25. The spacer 38 provides spacing of the clip 10 within the roof ditch 20 to aid in locating and orienting the clip 10 to the panels 12A, 12B of the vehicle 14 during assembly.

A sealant 40 is disposed on the surface 24 of the body 22. The sealant 40 may be a structural adhesive and is configured to expand upon application of a condition. As the sealant 40 expands, the sealant 40 extends through the opening 26 and engages the panels 12A, 12B of the vehicle 14 to retain the clip 10 to the panels 12A, 12B of the vehicle 14. The sealant 40 may be applied to the clip 10 as part of a molding 18 process when the clip 10 is formed, i.e., a two shot component. However, it should also be appreciated that the sealant 40 may be applied to the clip 10 during any other method known to those skilled in the art. The surface 24 defines a recess 42 that surrounds the fastener 25. The sealant 40 may be disposed within the recess 42. The recess 42 may be circular in shape. However, the recess 42 may be any other desired shape that surrounds the fastener 25. The surface 24 may also define a groove 44 that extends in spaced relationship to the recess 42 and also surrounds the fastener 25. The sealant 40 may also be disposed in the groove 44. The groove 44 may be rectangular in shape. However, the groove 44 may be any other desired shape that adequately surrounds the fastener 25. A pair of standoffs 46 may also extend from the surface 24 of the body 22. When the clip 10 is attached to the panels 12A, 12B, the standoffs 46 abut a floor 48 of the panels 12A, 12B to provide a gap G between the surface 24 of the clip 10 and the floor 48 to hold the surface 24 in spaced relationship to the floor 48. This gap G is important because the sealant 40 expands between approximately 200% and 500%, by volume, upon application of the condition to the sealant 40. The sealant 40 expands from the groove 44 and the recess 42 and flows along the gap G and through the opening 26 to wrap around the panels 12A, 12B to abut the underside 32 of one of the panels 12A, 12B and seal where the panels 12A, 12B come together. This means that the sealant 40 expands through the opening 26 to interlock with the panels 12A, 12B. The interlock between the sealant 40 and the panels 12A, 12B secures the clip 10 to the panels 12A, 12B and seals the opening 26 to prevent water from entering the panels 12A, 12B through the opening 26. The condition may be heat in a temperature range of between about 180 degrees Fahrenheit (F.) and 400 degrees F. Typically, the clips 10 are attached to the panels 12A, 12B in a body shop or a paint shop during vehicle 14 assembly. This means that the clips 10 go through one or more paint and/or electrodeposited polymer ("ELPO") ovens within the paint shops. It is within the paint ovens that the condition of heat is applied to the clips 10 and the sealant 40 expands. Therefore, in order for the clips 10 to maintain their structural integrity, the clips must be formed from a material that has a melt temperature that at is greater than the least 400 degrees F., any other temperature of paint and/or ELPO oven known to those skilled in the art, and/or any other bake curing process/cycle known to those skilled in the art during vehicle 14 assembly.

While the best modes for carrying out the invention have been described in detail, those familiar with the art to which this invention relates will recognize various alternative designs and embodiments for practicing the invention within the scope of the appended claims.

The invention claimed is:

1. A clip for attachment to at least one panel of a vehicle and configured to support a molding on the vehicle, said clip comprising:

a body presenting a surface;

a fastener extending from said surface and configured for engaging the at least one panel of the vehicle; and a sealant disposed on said surface and configured to expand upon application of a condition such that said sealant engages the at least one panel of the vehicle and retains said clip to the at least one panel of the vehicle.

2. A clip, as set forth in claim 1, wherein said surface defines a recess surrounding said fastener, wherein said sealant is disposed within said recess.

3. A clip, as set forth in claim 2, wherein said surface defines a groove in spaced relationship to said recess such that said groove surrounds said fastener, wherein said sealant is disposed in said groove.

4. A clip, as set forth in claim 1, further comprising a pair of standoffs extending from said surface such that said standoffs abut a floor of the at least one panel to provide a gap G between said surface and the floor to hold said surface in spaced relationship to the floor.

5. A clip, as set forth in claim 1, wherein said sealant expands between approximately 200% and 500%, by volume, upon application of the condition.

6. A clip, as set forth in claim 5, wherein said condition comprises a temperature in the range of between 180 degrees Fahrenheit and 400 degrees Fahrenheit.

7. A clip, as set forth in claim 1, wherein said clip is comprised of a polymer.

8. A clip, as set forth in claim 7, wherein said polymer is a polyamide.

9. A clip, as set forth in claim 8, wherein said polyamide is a nylon.

10. A clip, as set forth in claim 7, wherein said polymer is a thermoplastic.

11. A clip, as set forth in claim 1, wherein said fastener and said body are a single piece.

12. A clip, as set forth in claim 1, further including a pair of lips extending from said body, wherein said lips are configured for supporting the molding.

13. A molding system for attachment to a panel of a vehicle, said molding system comprising:

a clip including;

a body presenting a surface, a pair of lips extending from said body in opposition to said surface, a fastener extending from said surface and configured for engaging the at least one panel of the vehicle, and a sealant disposed on said surface and configured to expand upon application of a condition such that said sealant engages the at least one panel of the vehicle to retain said clip to the at least one panel of the vehicle;

a molding configured for attachment to said pair of lips of said clip.

14. A molding system, as set forth in claim 13, further comprising a pair of standoffs extending from said surface such that said standoffs abut a floor of the panel to provide a gap G between said surface and the floor to hold said surface in spaced relationship to the floor.

15. A molding system, as set forth in claim 13, further including a pair of anus extending from said base in generally spaced and parallel relationship and said lips extend from said pair of arms.

16. A molding system, as set forth in claim 13, wherein said molding has a generally C-shaped cross-section.

17. A method of attaching a clip to at least one panel of a vehicle, said method comprising:

inserting a fastener of the clip through an opening in the at least one panel of the vehicle to engage the at least one panel and hold the clip to the at least one panel; and applying a condition to the clip such that a sealant disposed on the clip expands through the opening to seal the opening and retain the clip to the at least one panel.

18. A method, as set forth in claim 17, wherein applying a condition is further defined as applying a condition to the clip such that a sealant disposed on the clip expands through the opening between approximately 200% and 500%, by volume, to seal the opening and retain the clip to the at least one panel.

19. A method, as set forth in claim 17, wherein applying a condition is further defined as heating the clip such that a sealant disposed on the clip expands through the opening to seal the opening and retain the clip to the at least one panel.

20. A method, as set forth in claim 19, wherein heating the clip is further defined as heating the clip to a temperature in the range of between 180 degrees Fahrenheit and 400 degrees Fahrenheit such that a sealant disposed on the clip expands through the opening to seal the opening and retain the clip to the at least one panel.

* * * * *